(12) United States Patent
Dabak et al.

(10) Patent No.: US 8,107,570 B2
(45) Date of Patent: Jan. 31, 2012

(54) SPACE TIME BLOCK CODED TRANSMIT ANTENNA DIVERSITY FOR WCDMA

(75) Inventors: Anand G. Dabak, Plano, TX (US); Rohit Negi, Stanford, CA (US)

(73) Assignee: Texas Instruments Incorporated, Dallas, TX (US)

( * ) Notice: Subject to any disclaimer, the term of this patent is extended or adjusted under 35 U.S.C. 154(b) by 267 days.

(21) Appl. No.: 12/565,443

(22) Filed: Sep. 23, 2009

(65) Prior Publication Data

US 2010/0014619 A1    Jan. 21, 2010

Related U.S. Application Data

(60) Division of application No. 10/601,866, filed on Jun. 23, 2003, now Pat. No. 7,613,259, which is a continuation of application No. 09/205,029, filed on Dec. 3, 1998, now Pat. No. 6,643,338.

(60) Provisional application No. 60/103,443, filed on Oct. 7, 1998.

(51) Int. Cl.
*H04B 7/10* (2006.01)
*H04L 1/02* (2006.01)

(52) U.S. Cl. .......................... 375/347; 375/340; 375/349

(58) Field of Classification Search .......... 375/259–260, 375/285, 377, 340–349
See application file for complete search history.

(56) References Cited

U.S. PATENT DOCUMENTS

| 5,140,615 | A | * | 8/1992 | Jasper et al. | 375/347 |
| 5,228,054 | A | * | 7/1993 | Rueth et al. | 708/252 |
| 5,305,353 | A | * | 4/1994 | Weerackody | 375/347 |
| 5,329,547 | A | * | 7/1994 | Ling | 370/342 |
| 5,379,324 | A | * | 1/1995 | Mueller et al. | 375/340 |
| 5,457,712 | A | * | 10/1995 | Weerackody | 375/347 |
| 5,581,580 | A | * | 12/1996 | Lindbom et al. | 375/340 |
| 5,737,327 | A | * | 4/1998 | Ling et al. | 370/335 |
| 5,848,103 | A | * | 12/1998 | Weerackody | 375/295 |
| 5,912,931 | A | * | 6/1999 | Matsumoto et al. | 375/340 |
| 6,137,843 | A | * | 10/2000 | Chennakeshu et al. | 375/340 |
| 6,185,258 | B1 | * | 2/2001 | Alamouti et al. | 375/260 |
| 6,775,329 | B2 | * | 8/2004 | Alamouti et al. | 375/267 |

* cited by examiner

*Primary Examiner* — Jean B Corrielus
(74) *Attorney, Agent, or Firm* — Ronald O. Neerings; Wade James Brady, III; Frederick J. Telecky, Jr.

(57) ABSTRACT

A mobile communication system is designed with an input circuit coupled to receive a first plurality of signals ($r_j(i+\tau_j)$, $i=0$-$N-1$) during a first time (T0-T1) from an external source and coupled to receive a second plurality of signals ($r_j(i+\tau_j)$, $i=N$-$2N-1$) during a second time (T1-T2) from the external source. The input circuit receives each of the first and second plurality of signals along respective first and second paths (j). The input circuit produces a first input signal ($R_j^1$) and a second input signal ($R_j^2$) from the respective first and second plurality of signals. A correction circuit is coupled to receive a first estimate signal ($\alpha_j^1$), a second estimate signal ($\alpha_j^2$) and the first and second input signals. The correction circuit produces a first symbol estimate ($\tilde{S}_1$) in response to the first and second estimate signals and the first and second input signals. The correction circuit produces a second symbol estimate ($\tilde{S}_2$) in response to the first and second estimate signals and the first and second input signals.

3 Claims, 4 Drawing Sheets

SPACE TIME BLOCK CODED TRANSMIT ANTENNA DIVERSITY FOR WCDMA

This application is a divisional of prior application Ser. No. 10/601,866, filed Jun. 23, 2003, currently pending;
Which was a continuation of prior application Ser. No. 09/205,029, filed Dec. 3, 1998; now U.S. Pat. No. 6,643,338, granted Nov. 4, 2003;
Which claimed priority from Provisional Application No. 60/103,443, filed Oct. 7, 1998.

FIELD OF THE INVENTION

This invention relates to wideband code division multiple access (WCDMA) for a communication system and more particularly to space time block coded transmit antenna diversity for WCDMA.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in Provisional U.S. Patent Application No. 60/082,671, filed Apr. 22, 1998, and incorporated herein by reference. These WCDMA systems are coherent communications systems with pilot symbol assisted channel estimation schemes. These pilot symbols are transmitted as quadrature phase shift keyed (QPSK) known data in predetermined time frames to any receivers within range. The frames may propagate in a discontinuous transmission (DTX) mode. For voice traffic, transmission of user data occurs when the user speaks, but no data symbol transmission occurs when the user is silent. Similarly for packet data, the user data may be transmitted only when packets are ready to be sent. The frames include pilot symbols as well as other control symbols such as transmit power control (TPC) symbols and rate information (RI) symbols. These control symbols include multiple bits otherwise known as chips to distinguish them from data bits. The chip transmission time ($T_C$), therefore, is equal to the symbol time rate (T) divided by the number of chips in the symbol (N).

Previous studies have shown that multiple transmit antennas may improve reception by increasing transmit diversity for narrow band communication systems. In their paper *New Detection Schemes for Transmit Diversity with no Channel Estimation*, Tarokh et al. describe such a transmit diversity scheme for a TDMA system. The same concept is described in *A Simple Transmitter Diversity Technique for Wireless Communications* by Alamouti. Tarokh et al. and Alamouti, however, fail to teach such a transmit diversity scheme for a WCDMA communication system.

Other studies have investigated open loop transmit diversity schemes such as orthogonal transmit diversity (OTD) and time switched time diversity (TSTD) for WCDMA systems. Both OTD and TSTD systems have similar performance. Both use multiple transmit antennas to provide some diversity against fading, particularly at low Doppler rates and when there are insufficient paths for the rake receiver. Both OTD and TSTD systems, however, fail to exploit the extra path diversity that is possible for open loop systems. For example, the OTD encoder circuit of FIG. 5 receives symbols $S_1$ and $S_2$ on lead 500 and produces output signals on leads 504 and 506 for transmission by first and second antennas, respectively. These transmitted signals are received by a despreader input circuit (FIG. 6). The input circuit receives the $i^{th}$ of N chip signals per symbol together with noise along the $j^{th}$ of L multiple signal paths at a time $\tau_j$ after transmission. Both here and in the following text, noise terms are omitted for simplicity. This received signal $r_j(i+\tau_j)$ at lead 600 is multiplied by a channel orthogonal code signal $C_m(i+\tau_j)$ that is unique to the receiver at lead 604. Each chip signal is summed over a respective symbol time by circuit 608 and produced as first and second output signals $R_j^1$ and $R_j^2$ on leads 612 and 614 as in equations [1-2], respectively. Delay circuit 610 provides a one-symbol delay T so that the output signals are produced simultaneously.

$$R_j^1 = \sum_{i=0}^{N-1} r_j(i+\tau_j) = \alpha_j^1 S_1 + \alpha_j^2 S_2 \quad [1]$$

$$R_j^2 = \sum_{i=N}^{2N-1} r_j(i+\tau_j) = \alpha_j^1 S_1 - \alpha_j^2 S_2 \quad [2]$$

The OTD phase correction circuit of FIG. 7 receives the signals $R_j^1$ and $R_j^2$ as input signals corresponding to the $j^{th}$ of L multiple signal paths. The phase correction circuit produces soft outputs or signal estimates $\tilde{S}_1$ and $\tilde{S}_2$ for symbols $S_1$ and $S_2$ at leads 716 and 718 as shown in equations [3-4], respectively.

$$\tilde{S}_1 = \sum_{j=1}^{L} (R_j^1 + R_j^2)\alpha_j^{1*} = \sum_{j=1}^{L} 2|\alpha_j^1|^2 S_1 \quad [3]$$

$$\tilde{S}_2 = \sum_{j=1}^{L} (R_j^1 - R_j^2)\alpha_j^{2*} = \sum_{j=1}^{L} 2|\alpha_j^2|^2 S_2 \quad [4]$$

Equations [3-4] show that the OTD method provides a single channel estimate α for each path j. A similar analysis for the TSTD system yields the same result. The OTD and TSTD methods, therefore, are limited to a path diversity of L. This path diversity limitation fails to exploit the extra path diversity that is possible for open loop systems as will be explained in detail.

SUMMARY OF THE INVENTION

These problems are resolved by a mobile communication system comprising an input circuit coupled to receive a first plurality of signals during a first time from an external source and coupled to receive a second plurality of signals during a second time from the external source. The input circuit receives each of the first and second plurality of signals along respective first and second paths. The input circuit produces a first input signal and a second input signal from the respective first and second plurality of signals. A correction circuit is coupled to receive a first estimate signal, a second estimate signal and the first and second input signals. The correction circuit produces a first symbol estimate in response to the first and second estimate signals and the first and second input signals. The correction circuit produces a second symbol estimate in response to the first and second estimate signals and the first and second input signals.

The present invention improves reception by providing at least 2L diversity over time and space. No additional transmit power or bandwidth is required. Power is balanced across multiple antennas.

BRIEF DESCRIPTION OF THE DRAWINGS

A more complete understanding of the invention may be gained by reading the subsequent detailed description with reference to the drawings wherein.

DETAILED DESCRIPTION OF THE PREFERRED EMBODIMENTS

Figure 1:
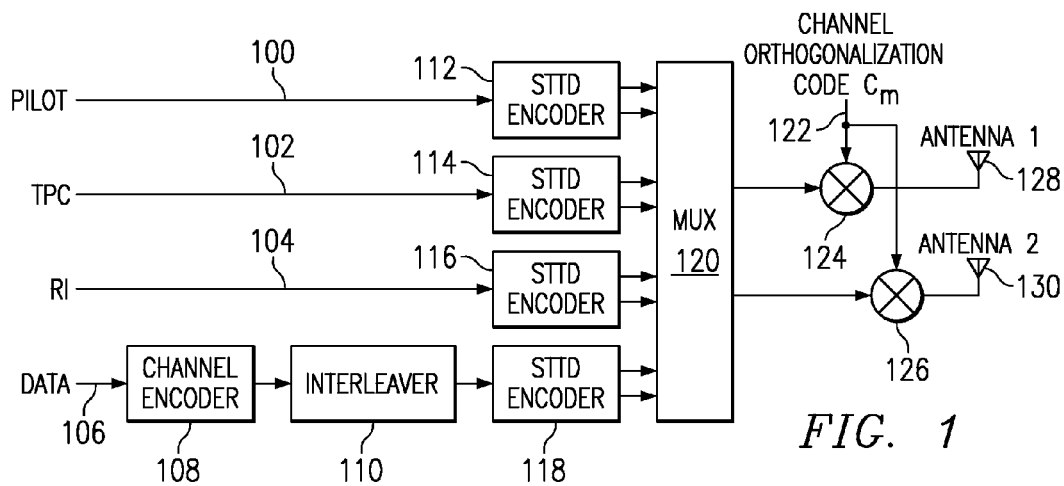
FIG. 1 is a simplified block diagram of a typical transmitter using Space Time Transit Diversity (STTD) of the present invention.

Referring to FIG. 1, there is a simplified block diagram of a typical transmitter using Space Time Transit Diversity (STTD) of the present invention. The transmitter circuit receives pilot symbols, TPC symbols, RI symbols and data symbols on leads 100, 102, 104 and 106, respectively. Each of the symbols is encoded by a respective STTD encoder as will be explained in detail. Each STTD encoder produces two output signals that are applied to multiplex circuit 120. The multiplex circuit 120 produces each encoded symbol in a respective symbol time of a frame. Thus, a serial sequence of symbols in each frame is simultaneously applied to each respective multiplier circuit 124 and 126. A channel orthogonal code $C_m$ is multiplied by each symbol to provide a unique signal for a designated receiver. The STTD encoded frames are then applied to antennas 128 and 130 for transmission.

Figure 2:
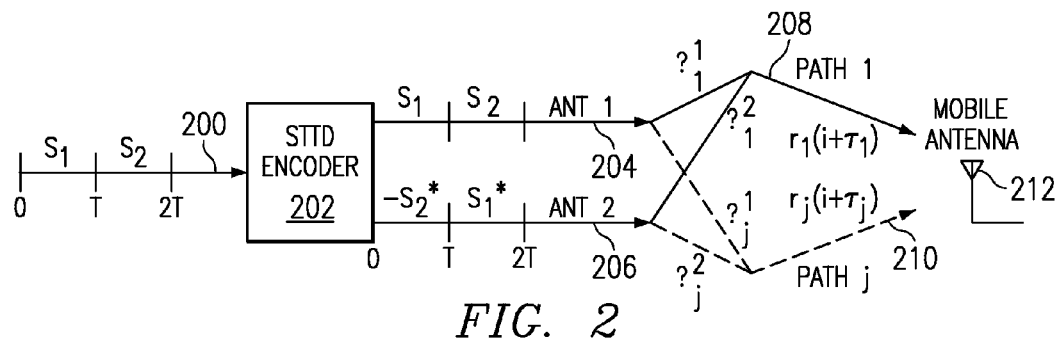
FIG. 2 is a block diagram showing signal flow in an STTD encoder of the present invention that may be used with the transmitter of FIG. 1.
Figure 6:
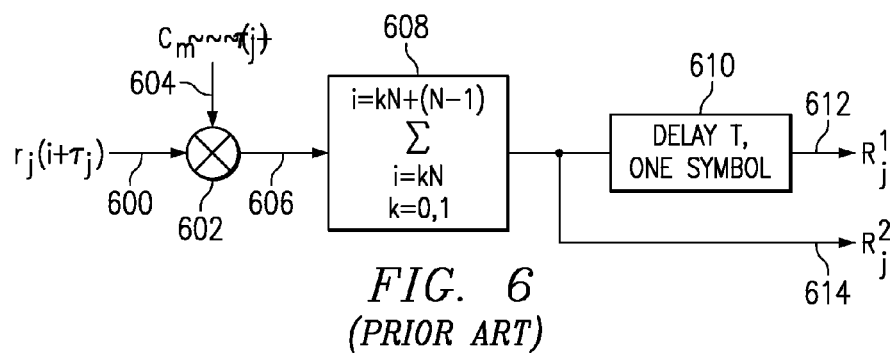
FIG. 6 is a block diagram of a despreader input circuit of the prior art.
Figure 7:
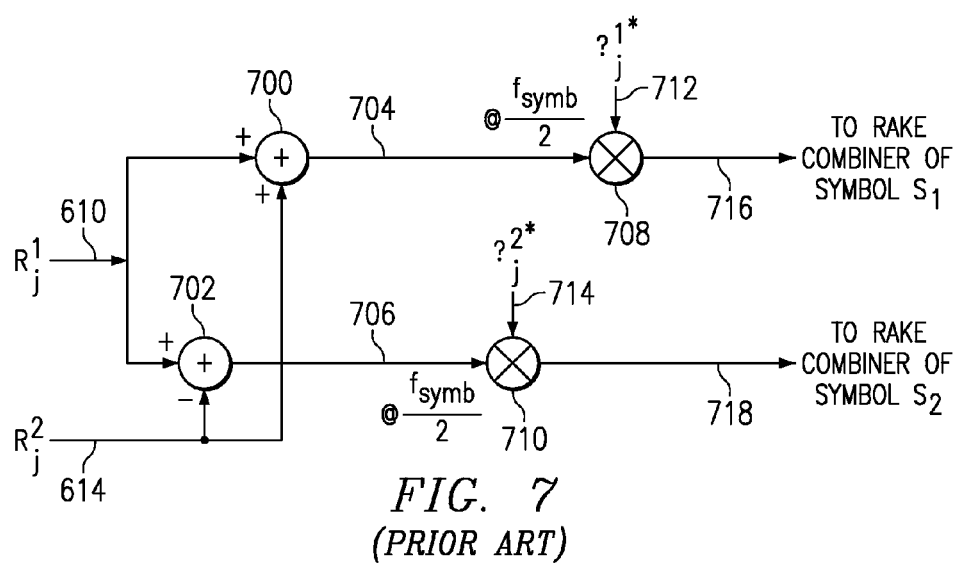
FIG. 7 is a schematic diagram of a phase correction circuit of the prior art.

Turning now to FIG. 2, there is a block diagram showing signal flow in an STTD encoder of the present invention that may be used with the transmitter of FIG. 1. The STTD encoder receives symbol $S_1$ at symbol time T and symbol $S_2$ at symbol time 2T on lead 200. The STTD encoder produces symbol $S_1$ on lead 204 and symbol $-S_2^*$ on lead 206 at symbol time T, where the asterisk indicates a complex conjugate operation. Furthermore, the symbol time indicates a relative position within a transmit frame and not an absolute time. The STTD encoder then produces symbol $S_2$ on lead 204 and symbol $S_1^*$ on lead 206 at symbol time 2T. The bit or chip signals of these symbols are transmitted serially along respective paths 208 and 210. Rayleigh fading parameters are determined from channel estimates of pilot symbols transmitted from respective antennas at leads 204 and 208. For simplicity of analysis, a Rayleigh fading parameter $\alpha_j^1$ is assumed for a signal transmitted from the first antenna 204 along the $j^{th}$ path. Likewise, a Rayleigh fading parameter $\alpha_j^2$ is assumed for a signal transmitted from the second antenna 206 along the $j^{th}$ path. Each $i^{th}$ chip or bit signal $r_j(i+\tau_j)$ of a respective symbol is subsequently received at a remote mobile antenna 212 after a transmit time $\tau_j$ corresponding to the $j^{th}$ path. The signals propagate to a despreader input circuit (FIG. 6) where they are summed over each respective symbol time to produce output signals $R_j^1$ and $R_j^2$ corresponding to the $j^{th}$ of L multiple signal paths as previously described.

Figure 8:
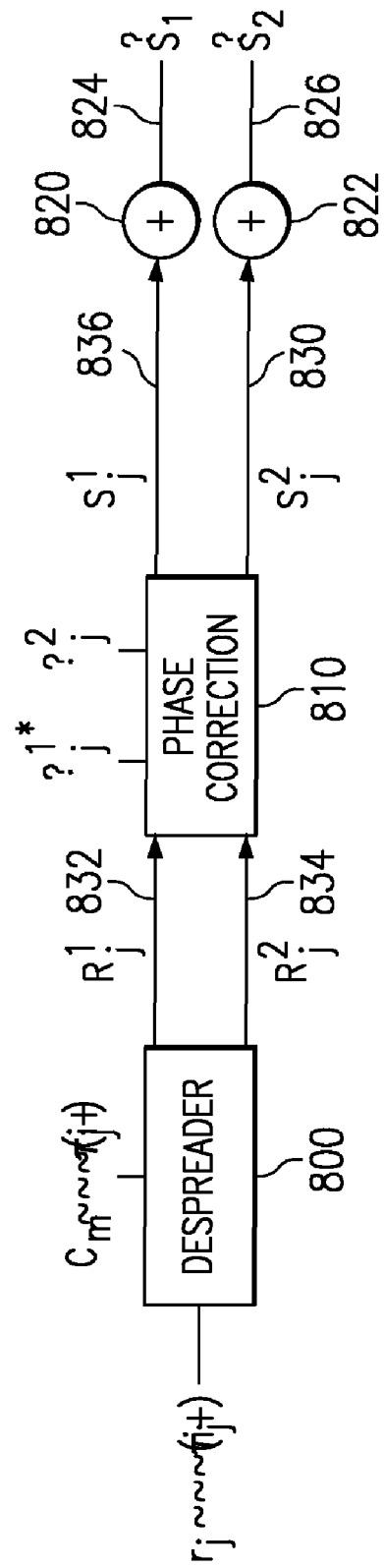
FIG. 8 is a space time block coded receiver of the present invention.

Referring now to FIG. 8, there is a space time block coded receiver of the present invention. The receiver including despreader circuit 800 coupled to receive respective path-specific signals $r_j(i+\tau_j)$ for the $i^{th}$ chip corresponding to paths j. These path-specific signals include a first input signal from a first antenna ANT 1 (FIG. 2) and a second input signal from a second antenna ANT2. The first antenna ANT 1 (FIG. 2) and a second input signal from a second antenna ANT2. The first input signal is transmitted along plural signal paths, each of the plural signal paths having a respective channel characteristic $\alpha_1^1$ through $\alpha_j^1$. The second input signal is also transmitted along respective plural signal paths, each having a respective channel characteristic $\alpha_1^2$ through $\alpha_1^2$. The despreader circuit (FIG. 8) produces and applies respective signals, for example signals $R_j^1$ and $R_j^2$ at leads 82 and 834, to phase correction circuit 810. Signal $R_j^1$ includes j symbols received at a first time from antenna ANT 1 according to equation [5]. Signal $R_j^2$ includes j symbols received at a second time from antenna ANT 2 according to equation [6]. The phase correction circuit is coupled to receive respective input signals and path-specific estimate signals, for example inputs signals $R_j^1$ and $R_j^2$, a first plurality of estimate signals and estimate signals $\alpha_j^{1*}$ and $\alpha_j^2$ at phase correction circuit 810. the phase correction circuit produces and applies respective symbol estimates according to equations [7-8], for example first and second symbol estimates $S_j^1$ and $S_j^2$ at leads 836 and 838, to rake combiner circuits 820 and 822. The plurality of first symbol estimates $S_j^1$ correspond to the j signal paths from antenna ANT 1 and include a first symbol estimate $S_1^1$. The plurality of second symbol estimates $S_j^2$ correspond to the j signal paths from antenna ANT 2 and include a second symbol estimate $S_1^2$. Rake combiner circuit 820 sums first symbol estimates from each path of the phase correction circuit and produces a first symbol signal $\tilde{S}_1$ at lead 824 according to equation [9]. Likewise, rake combiner circuit 822 sums second symbol estimates from each path of the phase correction circuit and produces a second symbol signs $\tilde{S}_2$ at lead 826 according to equation [10].

Figure 3:
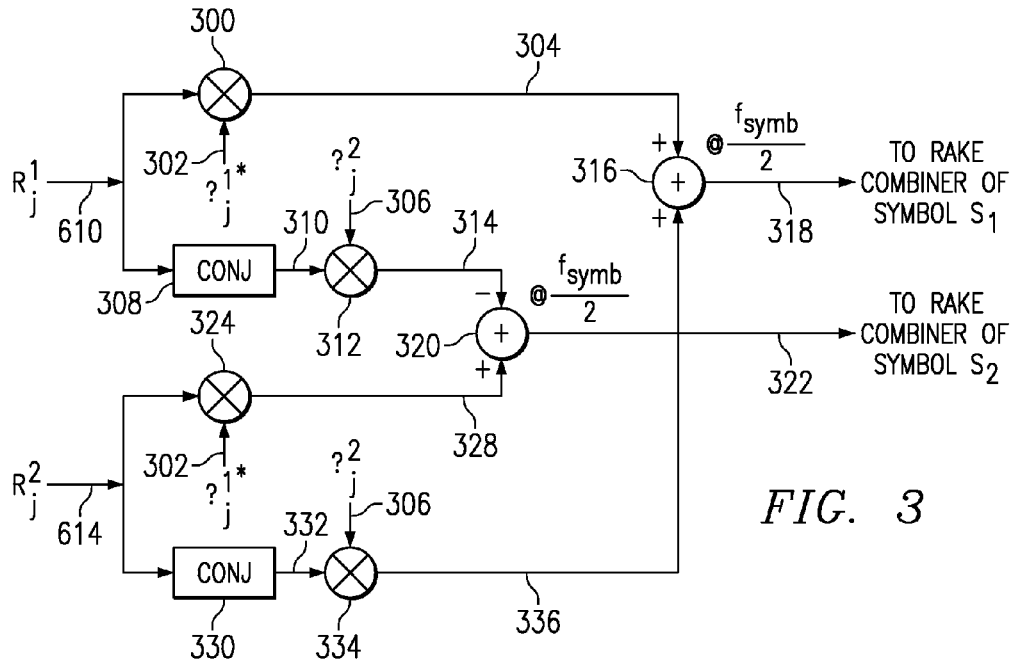
FIG. 3 is a schematic diagram of a phase correction circuit of the present invention that may be used with a receiver.

Referring now to FIG. 3, there is a schematic diagram of a phase correction circuit of the present invention that may be used with a remote mobile receiver as in FIG. 8. This phase correction circuit receives signals $R_j^1$ and $R_j^2$ as input signals on leads 610 and 614 as shown in equations [5-6], respectively.

$$R_j^1 = \sum_{i=0}^{N-1} r_j(i+\tau_j) = \alpha_j^1 S_1 - \alpha_j^2 S_2^* \quad [5]$$

$$R_j^2 = \sum_{i=N}^{2N-1} r_j(i+\tau_j) = \alpha_j^1 S_2 + \alpha_j^2 S_1^* \quad [6]$$

The phase correction circuit receives a complex conjugate of a channel estimate of a Rayleigh fading parameter $\alpha_j^{1*}$ corresponding to the first antenna on lead 302 and a channel estimate of another Rayleigh fading parameter $\alpha_j^2$ corresponding to the second antenna on lead 306. Complex conjugates of the input signals are produced by circuits 308 and 330 at leads 310 and 322, respectively. These input signals and their complex conjugates are multiplied by Rayleigh fading parameter estimate signals and summed as indicated to produce path-specific first and second symbol estimates at respective output leads 318 and 322 as in equations [7-8].

$$R_j^1 \alpha_j^{1*} + R_j^2 * \alpha_j^2 = (|\alpha_j^1|^2 + |\alpha_j^2|^2) S_1 \quad [7]$$

$$-R_j^{1*} \alpha_j^2 + R_j^2 \alpha_j^{1*} = (|\alpha_j^1|^2 + |\alpha_j^2|^2) S_2 \quad [8]$$

These path-specific symbol estimates are then applied to a rake combiner circuit to sum individual path-specific symbol estimates, thereby providing net soft symbols as in equations [9-10].

$$\tilde{S}_1 = \sum_{j=1}^{L} R_j^1 \alpha_j^{1*} + R_j^{2*} \alpha_j^2 \quad [9]$$

$$\tilde{S}_2 = \sum_{j=1}^{L} R_j^{1*} \alpha_j^2 + R_j^2 \alpha_j^{1*} \quad [10]$$

Figure 4A:
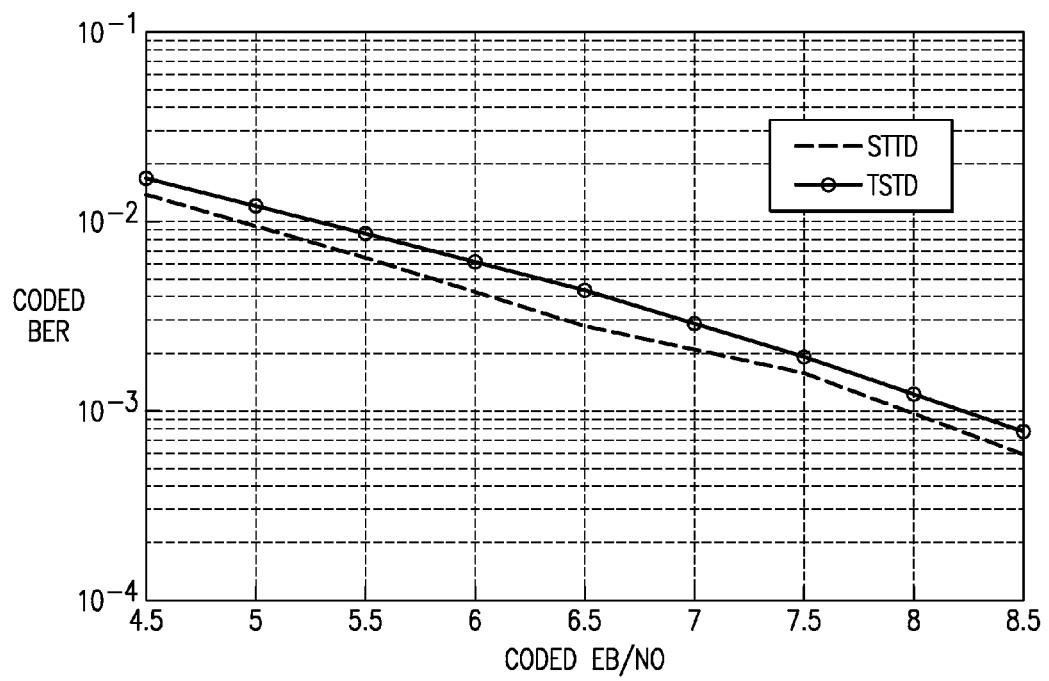
FIG. 4A is a simulation showing STTD performance compared to Time Switched Time Diversity (TSTD) for a vehicular rate of 3 kmph.
Figure 4B:
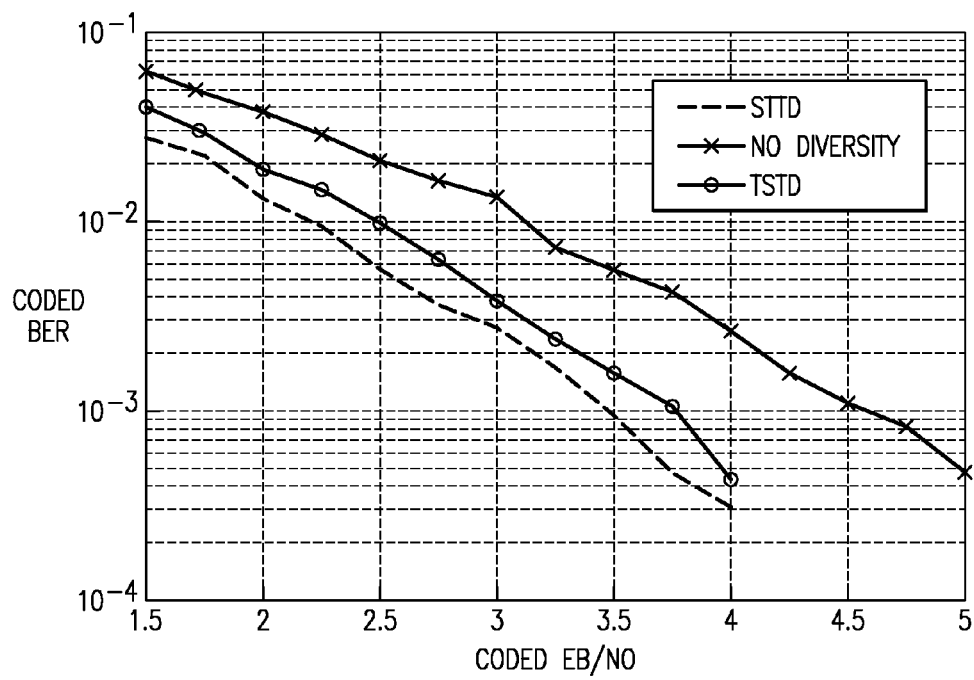
FIG. 4B is a simulation showing STTD performance compared to TSTD for a vehicular rate of 120 kmph.
Figure 5:
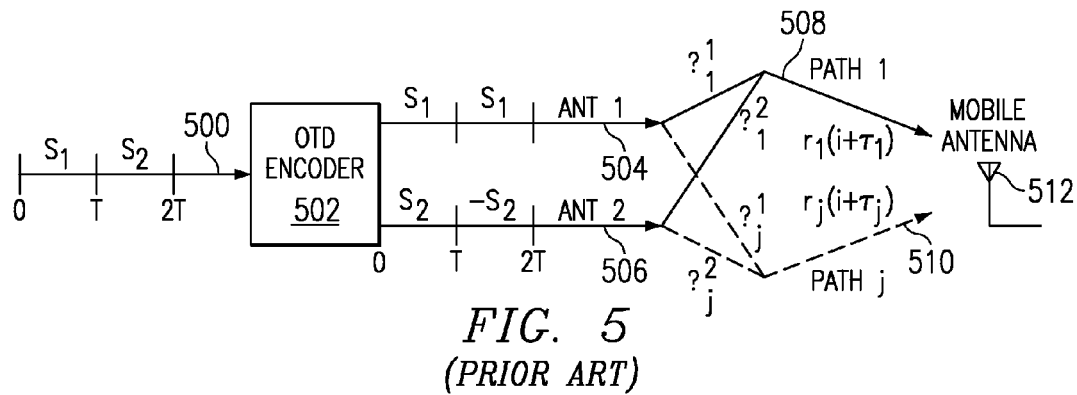
FIG. 5 is a block diagram showing signal flow in an OTD encoder of the prior art.

These soft symbols or estimates provide a path diversity L and a transmit diversity 2. Thus, the total diversity of the STTD system is 2L. This increased diversity is highly advantageous in providing a reduced bit error rate. The simulation result of FIG. 4 compares a bit error rate (BER) of STTD with TSTD for various ratios of energy per bit (Eb) to noise (No) at a relative speed of 3 Kmph. The OTD and TSTD systems were found to be the same in other simulations. The simulation shows that a 7.5 dB ratio Eb/No corresponds to a BER of 2.0E-3 for TSTD. The same BER, however, is achieved with a 7.2 dB ratio Eb/No. Thus, STTD produces approximately 0.3 dB improvement over TSTD. The simulation of FIG. 5 compares the BER of STTD with TSTD for various values of Eb/No at a relative speed of 120 Kmph. This simulation shows a typical 0.25 dB improvement for STTD over TSTD even for high Doppler rates. By way of comparison, STTD demonstrates a 1.0 dB advantage over the simulated curve of FIG. 5 without diversity at a BER of 2.6E-3. This substantial advantage further demonstrates the effectiveness of the present invention.

Although the invention has been described in detail with reference to its preferred embodiment, it is to be understood that this description is by way of example only and is not to be construed in a limiting sense. For example, several variations in the order of symbol transmission would provide the same 2L diversity. Moreover, the exemplary diversity of the present invention may be increased with a greater number of transmit or receive antennas. Furthermore, novel concepts of the present invention are not limited to exemplary circuitry, but may also be realized by digital signal processing as will be appreciated by those of ordinary skill in the art with access to the instant specification.

It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed is:

1. A phase correction circuit comprising:
   A. a first input lead carrying a first signal $R_j^1$;
   B. a second input lead carrying a second signal $R_j^2$;
   C. first multiplier circuitry having one input connected to the first lead, a second input receiving a complex conjugate of a first Rayleigh fading parameter estimate signal $a_j^{1*}$, and an output;
   D. second multiplier circuitry having one input connected to the second lead, a second input receiving the complex conjugate of the first Rayleigh fading parameter estimate signal $a_j^{1*}$, and an output;
   E. first complex conjugate circuitry having an input connected to the first lead and an output;
   F. second complex conjugate circuitry having an input connected to the second lead and an output;
   G. third multiplier circuitry having one input connected to the output of the first complex conjugate circuitry, a second input receiving a second Rayleigh fading parameter estimate signal $a_j^2$, and an output;
   H. fourth multiplier circuitry having one input connected to the output of the second complex conjugate circuitry, a second input receiving the second Rayleigh fading parameter estimate signal $a_j^2$, and an output;
   I. first summing circuitry having a first positive input connected to the output of the first multiplier circuitry, a second positive input connected to the output of the fourth multiplier circuitry, and an output providing a first symbol estimate signal; and
   J. second summing circuitry having a first negative input connected to the output of the third multiplier circuitry, a second positive input connected to the output of the second multiplier circuitry, and an output providing a second symbol estimate signal.

2. The phase correction circuit of claim 1 in which the output of the first summing circuitry is connected to first rake combiner circuitry and the output of the second summing circuitry is connected to second rake combiner circuitry.

3. The phase correction circuit of claim 1 in which the first signal Rj1 equals $a_j^1 S_1$ minus $a_j^2 S_2^*$ and the second signal $R_j^2$ equals $a_j^1 S_2$ plus $a_j^2 S_1^*$.

* * * * *